United States Patent [19]
Irish

[11] Patent Number: 5,271,581
[45] Date of Patent: Dec. 21, 1993

[54] WINDOW CLIP FOR AIRCRAFT

[76] Inventor: Michael J. Irish, 4434 NE. 23rd Ct., Renton, Wash. 98059

[21] Appl. No.: 891,544

[22] Filed: May 29, 1992

[51] Int. Cl.$^5$ ............................................. B64C 1/14
[52] U.S. Cl. ................................. 244/129.3; 52/208; 296/201
[58] Field of Search ............... 244/129.3; 296/201, 296/146 M; 267/164, 160, 158; 52/208, 401, 400, 399

[56] References Cited

U.S. PATENT DOCUMENTS

| | | | |
|---|---|---|---|
| 2,808,355 | 10/1957 | Christie et al. | 244/129.3 |
| 2,989,338 | 6/1961 | Hezler, Jr. | 52/208 |
| 3,094,738 | 6/1963 | Chase | 267/164 |
| 4,343,121 | 8/1982 | Kruschwitz et al. | 52/208 |
| 4,611,850 | 9/1986 | Fujikawa | 296/201 |
| 4,703,973 | 11/1987 | Fujikawa | 52/208 |
| 4,793,108 | 12/1988 | Bain et al. | 52/208 |

FOREIGN PATENT DOCUMENTS 0218419 9/1986 Japan ..................... 296/201

Primary Examiner—Joseph F. Peters, Jr.
Assistant Examiner—Anne E. Bidwell
Attorney, Agent, or Firm—Elizabeth F. Harasek; B. A. Donahue

[57] ABSTRACT

A window clip for attaching window panes to aircraft supporting structures comprises a clip body which has an outwardly bent flange at the bottom which applies pressure to the inner pane of an aircraft window and an inwardly bent u-shaped platform at the top. A hole is located in the platform portion for receiving a fastener to attach the clip to an underlying support. A spacer is optionally located on the fastener.

6 Claims, 3 Drawing Sheets

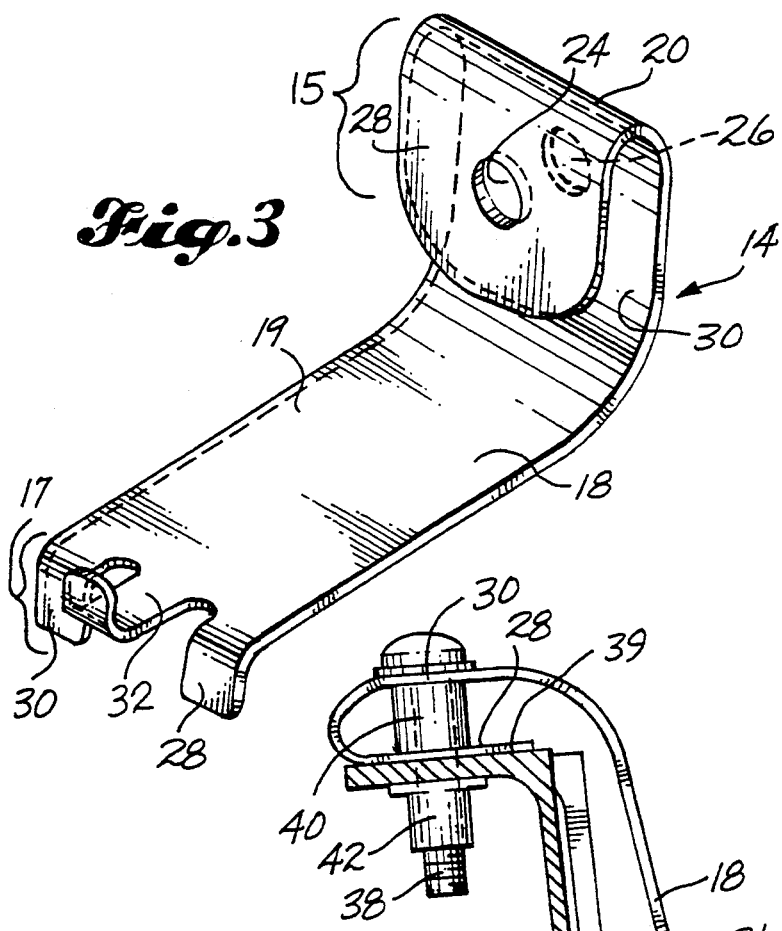
Fig.3
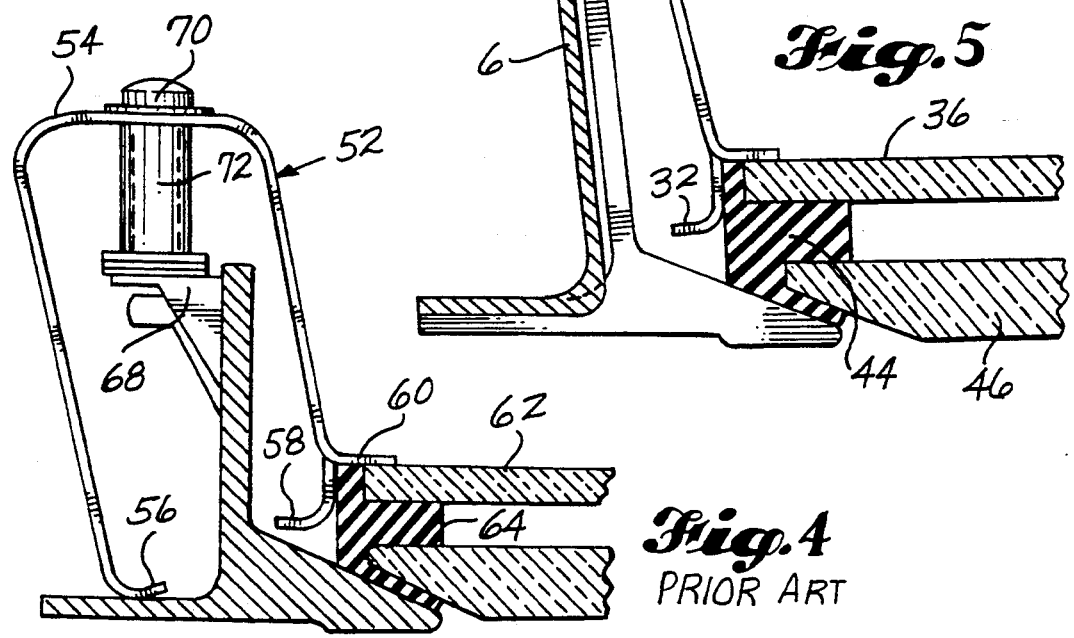
Fig.5
Fig.4 PRIOR ART

WINDOW CLIP FOR AIRCRAFT

This invention relates to a novel window clip for attaching windows to commercial aircraft. More particularly this invention relates to a window clip designed to attach windows to commercial aircraft hatches and doors.

BACKGROUND

Aircraft windows are generally secured to the underlying support by means of clips which attach to stuctural members. Ideally, such clips are lightweight, strong and promote an airtight seal between the window and the support which is not affected by pressure differentials between the inside and outside of the aircraft.

FIG. 4 shows a prior art overbeam clip 52 for attaching windows to aircraft hatches. Clip 52 has a u-shaped backbone segment 54 with inwardly curving beam end 56 and window end 58. Tang 60 overhangs inner window pane 62. Pane 62 is set in seal 64 with outer pane 66. Clip 52 is screwed into support beam 68 by means of screw 70. Spacer 72 is inserted between clip 52 and beam 68.

Prior art clip 52 and clips with similar backbone structures such as that shown in U.S. Pat. No. 4,793,108, assigned to the assignee hereof, have a number of undesirable properties. For example, the clip must have the exact proper length to form a tight, but not too tight, seal with the window. Because the length of the clip is so critical, several different clips and spacers may be needed for the same aircraft. It is also possible for the installer to tighten the clip down too hard and crack the window or not hard enough to form a tight seal. If a clip loosens, it can chafe the window surround, beam or window by wobbling or rotating around the mounting screw.

U.S. Pat. No. 4,611,850 to Fujikawa shows a clip, detail 18, for attaching a window to an automobile in conjunction with a second clip, detail 17A, a rubber gasket, detail 16, and a screw, detail 15A. U.S. Pat. No. 3,094,738 shows a biased spring with a spacer for a door closer. U.S. Pat. No. 2,989,338 shows a clip for retaining a window gasket in place in an automotive vehicle, which is similar to the prior art clip described above.

None of these prior art clips, nor any combination of them, suggests a clip for aircraft window panes that eliminates the drawbacks noted above.

BRIEF SUMMARY OF THE INVENTION

In accordance with a preferred embodiment of the invention, a novel window clip for attaching window panes to aircraft supporting structures comprises a clip body which has an outwardly bent flange at the bottom which applies pressure to the inner pane of aircraft window and an inwardly bent u-shaped platform at the top. A hole is located in the platform portion for receiving a screw to attach the clip to an underlying support. A spacer is located on the screw which prevents overtightening and any deformaty of the clip as it is attached. The invention will be better understood in terms of the several figures and the following detailed description.

FIG. 3 is an isometric view of a window clip in accordance with the invention.

FIG. 4 is a side view of a prior art window clip.

FIG. 5 is a side view of a window clip in accordance with the invention shown after it has been installed to secure a window to a structural overbeam in an aircraft door.

DETAILED DESCRIPTION OF THE INVENTION

Figure 1:
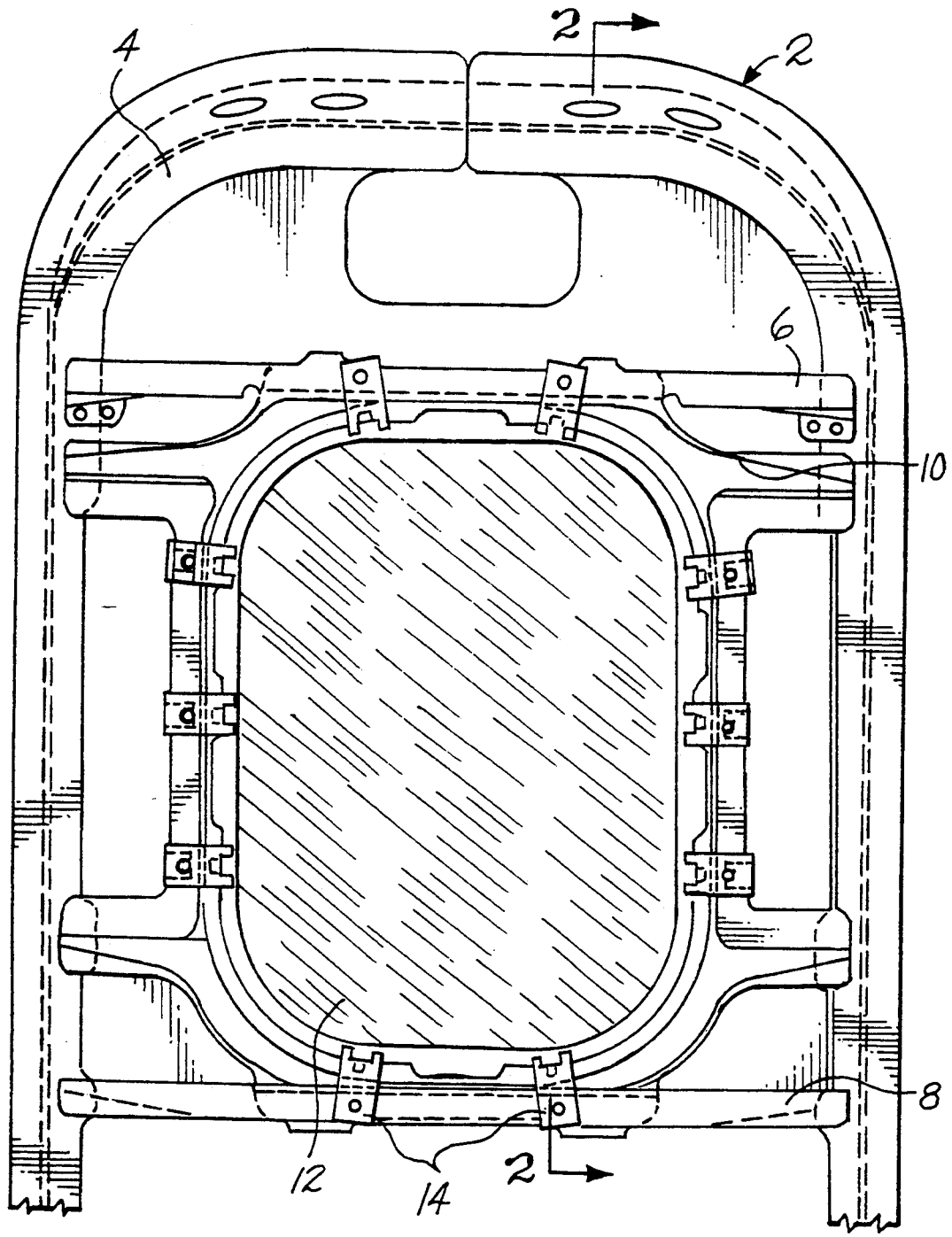
FIG. 1 is a front view of a window in a door hatch of a commercial airplane showing several window clips in accordance with the invention.
Figure 2:
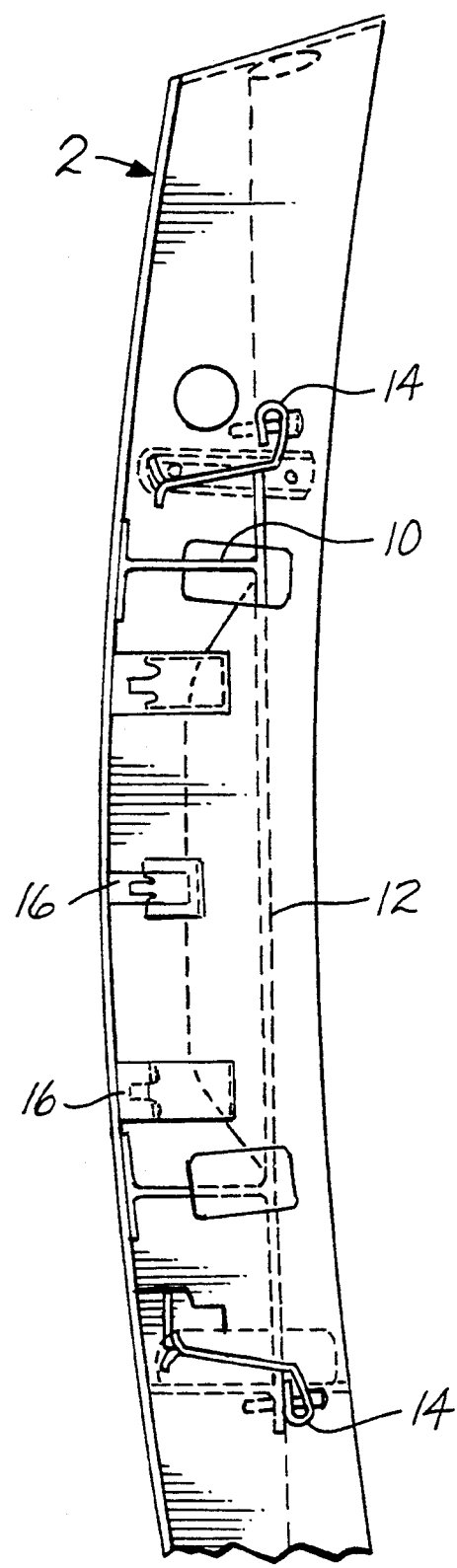
FIG. 2 is a side view, partly in section, taken across line 2—2 of FIG. 1.

Referring to FIGS. 1 and 2, front and side sectional views of a hatch 2 for a commercial airplane are shown. Hatch 2 comprises an outer structural aluminum frame 4 to which top overbeam 6 and bottom overbeam 8 are attached. Window frame 10 surrounds inner window pane 12. Pane 12 is secured to hatch 2 by overbeam clips 14 and side clips 16. FIG. 3 shows an isometric view of overbeam clip 14. Clip 14 comprises support portion 18 which is of a length suitable for mounting on a beam or support of a given thickness. Clip 14 has a top portion 15, bottom portion 17, inward side 19 and outward side 21 Portion 20 is bent over itself in a u-shape and holes 24, on platform leg 28 of top 20, and 26, on biasing leg 30, are located to be in line with each other to receive a fastener.

Bottom 17 of support 18 is split and bent in an outward direction to form tabs 28 and 30 which press a inner window pane 12 downward against a frame 10. Locator tab 32 is bent inwardly and biases agains inner window pane 12 to prevent its lateral movement after clip 14 is installed.

FIGS. 5 shows a clip 14 in accordance with the invention installed on a inner window pane 12 in greater detail. Support portion 18 is sized to span the distance between top 34 of overbeam 6 and top 36 of inner window pane 12. Screw 38 extends between hole 24, on platform leg 28 of top 20, and hole 26, on biasing leg 30.

Spacer 40 is positioned between platform leg 28 and biasing leg 30 and prevents overtightening of screw 38 in nut 42 which, in turn prevents excess application of force to window 12. More particularly, spacer 40 assures that the force applied by said outwardly bent legs 28 and 30 is predetermined and repeatable. In particular, tabs 28 and 30 press on inner window pane 12 hard enough to prevent any air leaks, even when pressure differentials are experienced on either side of the window, but not so hard as to initiate stress or fatigue cracking. Locator tab 32 biases against polymeric seal 44 in which inner window pane 12 and outer window pane 46 are mounted.

In accordance witht the invention, the subject clips may be formed of any material with suitable strength and elasticity. For the airplane application, stainless steel has been found to be suitable. Other materials could include fiber-resin composites such as graphite and epoxy, spring steel, or other materials known to those skilled in the art. It may be desirable to coat the clips to prevent any galvanic action between the airplane substructure and the clip.

While a screw is shown as a preferred fastener for the subject clip, other fasteners such as rivets, studs, polymeric screws and other such devices may be used by one skilled in the art.

While my invention has been described in terms of specific embodiments thereof, other forms may be readily adapted by one skilled in the art. Accordingly the scope of my invention is to be limited only by the scope the following claims.

I claim:

1. A window clip for attaching a window pane to an aircraft supporting structure, said clip comprising a clip body having top, and bottom portions, and inward and outward surfaces; the bottom portion of said body being split to form at least two flanges, one said flange being bent outwardly to apply downward pressure to a said aircraft window pane and another said flange being bent inwardly to prevent lateral movement of said aircraft window pane; and the top portion of said body being bent inwardly into a u-shape comprising a platform leg and a biasing leg, said platform and biasing legs having holes extending therethrough to receive a fastener to attach said clip to a said supporting structure.

2. The clip of claim 1 wherein said clip is made of stainless steel.

3. The clip of claim 1 wherein a spacer is provided around said fastener such that the force applied by said outwardly bent leg is predetermined and repeatable.

4. The clip of claim 1 or 6 comprising two outwardly bent flanges and one inwardly bent flange on said bottom portion.

5. Means for attaching a window pane to an aircraft supporting structure, said means comprising a clip comprising a clip body having top, and bottom portions and inward and outward surfaces; the bottom portion of said body being split to form at least two flanges, one said flange being bent outwardly to apply pressure to a said aircraft window pane and another said flange being bent inwardly to prevent lateral movement of said aircraft window pane; and the top portion of said body being bent inwardly into a u-shape comprising a platform leg and a biasing leg, said platform and biasing legs having holes extending therethrough to receive a screw to attach said clip to a said supporting structure; a screw for attaching said clip to a said supporting structure; and a spacer on said screw which is located between said platform and biasing legs.

6. A window clip for attaching a window pane to an aircraft supporting structure, said clip comprising a clip body having top, and bottom portions and inward and outward surfaces; the bottom portion of said body being split to form at least two flanges, one said flange being bent outwardly to apply pressure to a said aircraft window pane and another said flange being bent inwardly to prevent lateral movement of said aircraft window pane; and the top portion of said body being bent inwardly into a u-shaped platform, said platform having holes extending through both legs of said u-shape to receive a screw therethrough and attach said clip to a said supporting structure.

* * * * *